US008691373B2

(12) United States Patent
Soeda et al.

(10) Patent No.: US 8,691,373 B2
(45) Date of Patent: Apr. 8, 2014

(54) LAMINATE OR THERMOPLASTIC POLYMER COMPOSITION HAVING LOW AIR PERMEABILITY AND PNEUMATIC TIRE USING SAME AS INNER LINER

(75) Inventors: Yoshihiro Soeda, Hiratsuka (JP); Naoyuki Morooka, Hiratsuka (JP); Yuichi Hara, Hiratsuka (JP); Andy Haishung Tsou, Houston, TX (US)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 700 days.

(21) Appl. No.: 12/160,386

(22) PCT Filed: Jan. 10, 2006

(86) PCT No.: PCT/US2006/000588
§ 371 (c)(1),
(2), (4) Date: Sep. 22, 2008

(87) PCT Pub. No.: WO2007/081323
PCT Pub. Date: Jul. 19, 2007

(65) Prior Publication Data
US 2009/0038729 A1 Feb. 12, 2009

(51) Int. Cl.
*B29C 47/06* (2006.01)
*B32B 27/32* (2006.01)
*B32B 27/34* (2006.01)
*B60C 1/00* (2006.01)

(52) U.S. Cl.
USPC ........ 428/216; 428/474.4; 428/500; 428/521; 152/510; 264/171.26

(58) Field of Classification Search
USPC .............. 152/510; 428/475.5–476.1; 524/445
See application file for complete search history.

(56) References Cited

U.S. PATENT DOCUMENTS

| 5,040,583 | A | * | 8/1991 | Lin et al. ........................ | 152/510 |
| 5,576,372 | A | * | 11/1996 | Kresge et al. .................. | 524/442 |
| 5,633,065 | A | * | 5/1997 | Matsukura et al. ............ | 428/112 |
| 5,665,183 | A | * | 9/1997 | Kresge et al. .................. | 152/204 |
| 5,851,323 | A | * | 12/1998 | Kaido et al. .................... | 152/510 |
| 5,910,544 | A | * | 6/1999 | Ozawa et al. ................... | 525/178 |
| 5,992,486 | A | * | 11/1999 | Katsuki et al. .................. | 152/510 |
| 6,062,283 | A | * | 5/2000 | Watanabe et al. .............. | 152/510 |
| 6,068,026 | A | | 5/2000 | Garois | |
| 6,079,465 | A | * | 6/2000 | Takeyama et al. ............. | 152/510 |
| 6,136,123 | A | * | 10/2000 | Kaido et al. .................... | 156/123 |
| 6,334,919 | B1 | * | 1/2002 | Takeyama et al. ............. | 156/123 |
| 6,402,867 | B1 | * | 6/2002 | Kaido et al. .................... | 156/123 |
| 7,117,911 | B2 | | 10/2006 | Kanenari et al. | |
| 2002/0151636 | A1 | * | 10/2002 | Wada et al. ..................... | 524/445 |
| 2004/0089388 | A1 | * | 5/2004 | Fujino et al. ................... | 152/510 |
| 2004/0110899 | A1 | | 6/2004 | Miara et al. | |

FOREIGN PATENT DOCUMENTS

| EP | 0337279 | | 10/1989 |
| EP | 0703066 | | 3/1996 |
| EP | 0706878 | | 4/1996 |
| EP | 1419903 | | 5/2004 |
| JP | 4731761 | | 8/1972 |
| JP | 5508435 | | 11/1993 |
| JP | 5318618 | | 12/1993 |
| JP | 5330307 | | 12/1993 |
| JP | 06040207 | | 2/1994 |
| JP | 8244402 | | 9/1996 |
| JP | 8-259741 | A | 10/1996 |
| JP | 8259741 | | 10/1996 |
| JP | 10-217372 | A | 8/1998 |
| JP | 2002-052904 | A | 2/2002 |
| JP | 2004-530032 | A | 9/2004 |
| JP | 2009-523081 | A | 6/2009 |
| RU | 2250836 | C2 | 4/2005 |
| RU | 2270759 | C2 | 2/2006 |
| WO | WO-9201575 | | 2/1992 |
| WO | WO-02/28961 | A1 | 4/2002 |
| WO | WO-02/100923 | A2 | 12/2002 |
| WO | WO-2004081099 | | 9/2004 |
| WO | WO-2004081106 | | 9/2004 |
| WO | WO-2004081107 | | 9/2004 |
| WO | WO-2004081108 | | 9/2004 |
| WO | WO-2004081116 | | 9/2004 |
| WO | WO-2005044557 | A1 | 5/2005 |
| WO | WO-2007081323 | A1 | 7/2007 |

OTHER PUBLICATIONS

Kuraray Technical Bulletin 120: Processing EVAL® Resins, 2007.*
Office Action in Chinese Patent Application No. 200480050805.0 dated Jul. 17, 2009.
The Official Decision on Grant issued in related Russian Application No. 2008132863/04 on Aug. 11, 2010.
Office Action issued in corresponding Japanese Application No. 2012-240892 dated Sep. 3, 2013.

* cited by examiner

*Primary Examiner* — Ramsey Zacharia
(74) *Attorney, Agent, or Firm* — Novak Druce Connolly Bove + Quigg LLP

(57) ABSTRACT

A laminate (C) of a thermoplastic polymer composition comprising: a thermoplastic resin composition (A) having an permeation coefficient of $10 \times 10^{-12}$ cc·cm/cm²·sec·cmHg or less, laminated with a thermoplastic polymer composition (B) having a melt viscosity of 500-2000 Pa·s and a Young's modulus at a room temperature of 1-400 MPa, wherein the thickness of a layer of the thermoplastic resin composition (A) is 0.05-10 μm and the air permeation coefficient of the laminate (C) of $20 \times 10^{-12}$ cc·cm/cm²·sec·cmHg or less, and a pneumatic tire using the above laminate (C) as an inner liner.

19 Claims, No Drawings

LAMINATE OR THERMOPLASTIC POLYMER COMPOSITION HAVING LOW AIR PERMEABILITY AND PNEUMATIC TIRE USING SAME AS INNER LINER

This application is a national phase of PCT/US2006/000588, filed Jan. 10, 2006, the entire contents of which is hereby incorporated by reference.

TECHNICAL FIELD

The present invention relates to a low air permeable laminate of a thermoplastic polymer composition and a production process thereof as well as a pneumatic tire using the above laminate as an inner liner.

BACKGROUND OF THE INVENTION

Reduction of fuel consumption is one of the biggest technical themes in automobiles. As part of this, there have been increasingly strong demands made for the reduction of the weight of pneumatic tires.

The inner surface of a pneumatic tire typically has an inner liner comprising a low gas permeation rubber such as a butyl rubber or a halogenated butyl rubber so as to maintain a constant tire air pressure. A halogenated butyl rubber, however, has a large hysteresis loss, and therefore, when rippling occurs in the inner surface rubber of the carcass layer and the inner liner at the intervals between carcass cords after vulcanization of the tire, the inner liner rubber layer will deform along with the deformation of the carcass layer, and therefore, there will be the problem of an increase of the rolling resistance. Accordingly, in general, a rubber sheet called a tie rubber with a small hysteresis loss is interposed between the inner liner (typically halogenated butyl rubber) and inner surface rubber of the carcass layer to adhere the two. Therefore, in addition to the thickness of the inner liner of the halogenated butyl rubber, the thickness of the tie rubber is added and the thickness of the layers as a whole exceeds 1 mm (i.e., 1000 μm) which in the end causes an increase in the weight of the product.

Techniques have been proposed for using various materials, instead of a low gas permeation rubber such as a butyl rubber, as the inner liner of the pneumatic tire. For example, Japanese Examined Patent Publication (Kokoku) No. 47-31761 discloses coating the inner surface of a vulcanized tire with a solution or dispersion of synthetic resins such as polyvinylidene chloride, saturated polyester resin, polyamide resin having an air permeation coefficient (cm$^3$ (standard state)/cm·sec·mmHg) of not more than $10 \times 10^{-13}$ at 30° C. and not more than $50 \times 10^{-13}$ at 70° C., at a thickness of 0.1 mm or less.

The technique disclosed in Japanese Examined Patent Publication (Kokoku) No. 47-31761 describes providing a covering layer of a synthetic resin having a specific air permeation coefficient on the inner circumferential surface of the carcass or the inner circumferential surface of the inner liner of the vulcanized tire and keeping the thickness of the synthetic resin covering layer to 0.1 mm or less, but the pneumatic tire described in this publication has problems in the adhesiveness of the rubber and synthetic resin. Further, there is the defect that the inner liner layer is inferior in moisture resistance (or water resistance).

Japanese Unexamined Patent Publication (Kokai) No. 5-330307 discloses halogenation of the inner surface of the tire (using a conventionally known chlorination solution, bromine solution, or iodine solution) and then forming a polymer film (thickness of 10 to 200 μm) of methoxymethylated nylon, copolymerized nylon, a blend of polyurethane and polyvinylidene chloride, or a blend of polyurethane and polyvinylidene fluoride over the inner surface.

Further, Japanese Unexamined Patent Publication (Kokai) No. 5-318618 discloses a pneumatic tire having a thin film of methoxymethylated nylon as an inner liner. According to this technique, the inner surface of the green tire is sprayed or coated with a solution or emulsion of methoxymethylated nylon and the tire then vulcanized or the inner surface of the tire after vulcanization is sprayed or coated with a solution or emulsion of methoxymethylated nylon to produce a pneumatic tire. In these publications as well, in addition to the defect of the poor water resistance of the thin films, there is the defect of a difficulty in maintaining uniformity of the film thickness.

Further, Japanese Unexamined Patent Publication (Kokai) No. 6-40207 has an example of use of a multilayer film having a low air permeation layer comprising a polyvinylidene chloride film or an ethylene-vinyl alcohol copolymer film and an adhesive layer composed of a polyolefin film, an aliphatic polyamide film, or a polyurethane film as the air permeation preventive layer of the tire. In this system, however, the low air permeation layer lacks flexibility and the film cannot track expansion or contraction of the material when the tire is in use, and thus the tire splits.

Further, Japanese Unexamined Patent Publication (Kokai) No. 5-508435 proposes the use, as a tire inner liner composition, of a composition comprised of a halogen-containing copolymer of $C_4$ to $C_7$ isomonoolefin and p-alkylstyrene containing carbon black, a plasticizer oil, and a vulcanization agent for the tire inner liner, but the inner liner has an insufficient air permeation coefficient and is not suitable for reducing the weight of the tire further.

Thus, the material for forming the gas barrier layer used for the inner liner of a pneumatic tire etc. is required to have flexibility and a gas barrier property, but no material has yet been presented which has both of these properties.

Generally speaking, a thermoplastic elastomer composition which is composed of a thermoplastic resin component as a continuous phase and an elastomer component as a dispersed phase and in which at least part of the elastomer component is cross-linked (vulcanized) has the rubber elasticity performance derived from the elastomer component which has generally been cross-linked in the past, and, due to the thermoplastic resin component forming the continuous phase, can be thermoplastically molded at a high temperature where it melts and becomes fluid. Consequently, a thermoplastic elastomer composition having this dispersed structure has the characteristic of enabling formation by processing techniques similar to those of plastics while maintaining the properties of a vulcanized rubber.

Therefore, a thermoplastic elastomer composition has the following basic advantages when compared with vulcanized rubber:

(1) a separate vulcanization process is not required.

(2) recycling of the products and the scrap produced during the processing are possible.

(3) lightening of the weight is possible.

Among these, in particular, a thermoplastic elastomer composition (where a part or all of the elastomer component forming the dispersed phase is cross-linked (vulcanized) during mixing with the thermoplastic resin which forms the continuous phase and is dynamically cross-linked (vulcanized)), can in particular give a product superior in the mechanical physical properties of a rubber elastomer, resistance to compression set, and resistance to oil and can be used, instead of conventional rubber, for auto parts, building materials, medical equipments, general industrial materials, etc.

Relating to this thermoplastic elastomer composition, the present inventors previously proposed and filed an application (Japanese Patent Application No. 7-150353) (i.e., Japanese Unexamined Patent Publication No. 8-259741), for a polymer composition for a tire having an air permeation coefficient of not more than $25 \times 10^{-12}$ cc·cm/cm² sec·cmHg and a Young's modulus of 1 to 500 MPa which is superior in the balance of the air permeation preventive property and the flexibility as a polymer composition for a tire, which can be used to reduce the weight of the tire, and which is composed of a blend of a specific amount of a thermoplastic resin having an air permeation coefficient of not more than $25 \times 10^{-12}$ cc·cm/cm² sec·cmHg and a Young's modulus of more than 500 MPa and a specific amount of an elastomer component having an air permeation coefficient of more than $25 \times 10^{12}$ cc·cm/cm²·sec·cmHg and a Young's modulus of not more than 500 MPa.

This proposed composition had a superior function as a polymer composition for a tire, but when used as the inner liner or other air permeation preventive layer of a pneumatic tire had the problem that the adhesiveness with the rubber layer was not sufficient with the thermoplastic elastomer composition alone.

Further, the present inventors engaged in research to make the air permeation preventive property in the above polymer composition for a tire even more effective and proposed and filed an application (Japanese Patent Application No. 7-55929) (i.e., Japanese Unexamined Patent Publication No. 8-244402), for a thermoplastic resin composition for a tire forming an integral air permeation preventive layer by extruding a blend of at least two types of incompatible thermoplastic resins in the process of which one thermoplastic resin component among the thermoplastic resin components is not finally dispersed but is dispersed oriented in a flat form due to the shear stress at the time of extrusion as it is incompatible.

When this thermoplastic resin composition is used as the air permeation preventive layer of a pneumatic tire, since it is a thermoplastic resin composition, a sufficient air permeation preventive property can be obtained, but this was not sufficient to sufficiently control the flexibility and durability with respect to flexural fatigue and also there was the problem of an insufficient adhesiveness with the rubber layer with the thermoplastic resin composition alone.

Thus, as explained above, there is known a thermoplastic elastomer composition, having a thermoplastic resin component as a continuous phase and an elastomer component as a dispersed phase, which has rubber elasticity, is flexible, can be processed thermoplastically, and enables control of the air barrier property or gas barrier property. Further, there is known a thermoplastic resin composition which enables a layer having a gas permeation preventive property to be formed integrally inside the layers. A thermoplastic elastomer composition which has rubbery elasticity and can be thermoplastically processed and which enables the formation of a layer having bondability and other necessary functions integrally at the outside of the layers is not yet developed.

Other references of interest include: WO 2004/081107, WO 2004/081106, WO 2004/081108, WO 2004/081116, and WO 2004/081099.

SUMMARY OF INVENTION

An object of the present invention is to provide a laminate of a thermoplastic polymer composition having an air permeation coefficient of $20 \times 10^{-12}$ cc·cm/cm²·sec·cmHg or less and capable of use as an inner liner of a pneumatic tire, thus addressing the above-mentioned disadvantages of the prior art.

In accordance with the present invention, there is provided a laminate (C) of at least one thermoplastic polymer composition comprising: a thermoplastic resin composition (A) having an air permeation coefficient of $10 \times 10^{-12}$ cc·cm/cm²·sec·cmHg or less, laminated with a thermoplastic polymer composition (B) having a melt viscosity of 500-2000 Pa·s and a Young's modulus at a room temperature of 1-400 MPa, wherein the thickness of a layer of the thermoplastic resin composition (A) is 0.5-10 μm and the air permeation coefficient of the laminate (C) is $20 \times 10^{-12}$ cc·cm/cm²·sec·cmHg or less.

DETAILED DESCRIPTION OF THE INVENTION

In this description and in the claims which follow, the singular forms "a", "an" and "the" include plural referents unless the context clearly dictates otherwise.

As used herein all molecular weights are weight average molecular weight unless otherwise noted.

Throughout the entire description, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

In the present context, "consisting essentially of" is meant to exclude any element or combination of elements, as well as any amount of any element or combination of elements, that would alter the basic and novel characteristics of the invention.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. The term "substantially" also serves reasonably to describe the subject matter so that its scope would be understood by persons in the field of the invention, and to distinguish the claimed subject matter from the prior art.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form of the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two or more double bonds. In a preferred embodiment, the multiolefin is any monomer comprising two double bonds, preferably two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to carbon atoms which contains at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

As a material superior in gas barrier property, a polyamide thermoplastic resin (hereinafter referred to as a polyamide resin) has been known. Also, as a material superior in a flexibility, butyl rubber has been known. Instead of using a butyl rubber, we found that a laminate (C) of specified thermoplastic materials (A) and (B) could realize a material having a gas barrier property and flexibility in a good balance.

The thermoplastic resin composition used as the component (A) in the laminate (C) according to the present invention may be any thermoplastic resin composition having a low air permeation coefficient, preferably $25 \times 10^{-12}$ cc·cm/$cm^2$·sec·cmHg or less, more preferably $10 \times 10^{-12}$ cc·cm/$cm^2$·sec·cmHg or less, more preferably $1 \times 10^{-12}$ cc·cm/$cm^2$·sec·cmHg or less, more preferably from $0.1 \times 10^{-12}$ to $10 \times 10^{-12}$ cc·cm/$cm^2$·sec·cmHg. If the air permeation coefficient of the thermoplastic resin is too large, the desired balance of the gas barrier property and the flexibility cannot be obtained.

Typical examples of the thermoplastic resin (A) are ethylene-vinyl alcohol copolymers, polyamide resins, polyvinylidene chloride and copolymers thereof, acrylonitrile copolymers, polyvinylidene fluoride, polychlorotrifluoroethylene, polyethylene terephthalate, polyester resins, etc. The EVOH resins usable in the present invention as thermoplastic resin (A) include thermoplastic and crystalline ethylene-vinyl alcohol copolymers with at least 35 mol % of vinyl alcohol.

The polyamide resins usable in the present invention as thermoplastic resin (A) include thermoplastic polyamides (nylons) comprising crystalline or resinous, high molecular weight solid polymers including copolymers and terpolymers having recurring amide units within the polymer chain. Polyamides may be prepared by polymerization of one or more ε-lactams such as caprolactam, pyrrolidione, lauryllactam and aminoundecanoic lactam, or amino acid, or by condensation of dibasic acids and diamines. Both fiber-forming and molding grade nylons are suitable for use as thermoplastic resin (A). Examples of such polyamides are polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6IP), Nylon 46, Nylon MXD6, Nylon 6/66 and the condensation product of 11-aminoundecanoic acid (Nylon 11). Nylon 6 (N6), Nylon 11 (N11), Nylon 12 (N12), a Nylon 6/66 copolymer (N6/66), Nylon 610 (N610), Nylon 46, Nylon MXD6, Nylon 69 and Nylon 612 (N612) may also be used. The copolymers thereof any blends thereof may also be used. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention as thermoplastic resins (A), with linear crystalline polyamides having a softening point or melting point between 160° C.-230° C. being preferred.

The thermoplastic polymer composition usable as the component (B) in the laminate (C) according to the present invention are those having a melt viscosity of 500 to 2000 Pa·s, preferably 700 to 1500 Pa·s and a Young's modulus at a room temperature of 1 to 400 MPa, preferably 1 to 200 MPa. If the melt viscosity of the thermoplastic polymer (B) is too small or too large, the desired cylindrical molding (extrusion) becomes difficult and thus the film production becomes difficult. In addition, if the Young's modulus of the thermoplastic polymer (B) is too large, the film cannot follow the deformation and therefore cracks or fissures may occur.

Typical examples of the thermoplastic composition usable as the component (B) according to the present invention are those composed of modified polymers (E) dispersed in a matrix of a thermoplastic resin composition (D). Although there are no specific limitations to the ratio of the modified polymer (E) to the matrix (D), the preferable ratio is, for example, (D):(E) is 60:40 to 30:70 (by weight). Typical examples of the modified polymer (E) are brominated isobutyrene-p-methylstyrene copolymers, maleic anhydride-modified ethylene-α-olefin copolymers, ethylene-glycidyl-methacrylate (EGMA), maleic anhydride modified 7-ethylene-ethylacrylate (Mal-EEA), etc. Examples of the matrix (D) are polyamide resins such as Nylon 11, Nylon 12, Nylon 666, Nylon 610, Nylon 612, Nylon 6, Nylon 66.

The components (A), (B), (D) and (E) according to the present invention may contain, in addition to the above-mentioned essential constituents, conventional additives generally used therein, such as a vulcanization or cross-linking agent, a vulcanization or cross-linking accelerator, various types of oils, an antioxidant, reinforcing agent, plasticizer, softening agent, in an amount generally added in the past, so long as they do not adversely affect the objects of the present invention.

The laminates (C) of the present invention are composed of the thermoplastic resin composition layer (A) having a thickness of 0.05 to 10 μm, preferably 0.05 to 3 μm, which is laminated with a layer or layers of the thermoplastic polymer composition (B). Preferably, the laminate (C) is sandwiched with the same or different layers of the thermoplastic polymer compositions (B). The thermoplastic polymer composition (B) may be composed of the modified polymer composition (E) dispersed in the matrix (D) of thermoplastic polymer composition, as mentioned above.

The laminate (C) has an air permeation coefficient of $20 \times 10^{-12}$ cc·cm/cm$^2$·sec·cmHg or less, preferably $10 \times 10^{-12}$ cc·cm/cm$^2$·sec·cmHg or less.

The laminate (C) of the present invention can be in any form by using any known lamination technique. For example, the laminate (C) in the form of a sheet may be produced by multi-layer coextrusion, multi-layer inflation molding, etc. Alternatively, the laminate (C) in a cylindrical form may be produced by multi-layer extrusion molding, which is well-known in the art, of the thermoplastic resin composition (A) and the thermoplastic polymer composition (B).

The laminate (C) of the present invention may be advantageously used as an inner liner of a pneumatic tire, because the laminate (C) has a superior gas barrier property and an excellent flexibility in a good balance.

The laminate (C) with adhesive (F) of the present invention can be in any form by using any known lamination technique. For example, the laminate (C) with adhesive (F) in the form of a sheet may be produced by multi-layer coextrusion, multi-layer inflation molding, etc. Alternatively, the laminate (C) with adhesive (F) in a cylindrical form may be produced by multi-layer extrusion molding, which is well-known in the art, of the thermoplastic resin composition (A), the thermoplastic polymer composition (B) and the adhesive composition (F).

The laminate (C) with adhesive (F) of the present invention may be advantageously used as an inner liner of a pneumatic tire, because the laminate (C) with adhesive (F) has a superior gas barrier property and an excellent flexibility in a good balance.

The adhesive (F) have been proposed for using various formulations instead of Table V such as usual adhesives. For example, European Patent No. 0774340 discloses the difference of the critical surface tension with the rubber component of the tire member and the polymer component of the surface layer of the thermoplastic film.

Preferred modified polymer compositions useful as the dispersed phase of the thermoplastic polymer composition (B) include functionalized polymer(s) (having one or more functional groups). By "functionalized polymer(s)" is meant that the polymer is contacted with a functional group, and, optionally, a catalyst, heat, initiator, and/or free radical source, to cause all or part of the functional group to incorporate, graft, bond to, physically attach to, and/or chemically attach to the polymer. Accordingly, in one aspect, the functionalized polymer useful in the present invention comprises the contact product of a polymer, a functional group, and a functionalization catalyst (such as a catalyst, heat, initiator or free radical source). Such functionalization is also referred to herein as grafting. Likewise, a functional group is also referred to herein as a grafting monomer. Further, "functionalized polymer" is also defined to include polymer directly polymerized from monomers comprising olefin monomers and a monomer containing a functional group, (or using initiators having a functional group) to produce a polymer having a functional group.

By "maleated" polymer is meant a polymer which has been contacted with maleic acid or maleic anhydride, and, optionally, a catalyst, heat, initiator, and/or free radical source, to cause all or part of the maleic acid or maleic anhydride to incorporate, graft, bond to, physically attach to, and/or chemically attach to the polymer By "functional group" is meant any compound with a weight average molecular weight of 1000 g/mol or less that contains a heteroatom and or an unsaturation. Preferred functional groups include any compound with a weight average molecular weight of 750 or less, that contain one or more a hetero atoms and or one or more sites of unsaturation. Preferably the functional group is a compound containing a heteroatom and an unsaturation, such as maleic anhydride or maleic acid. Preferred functional groups include organic acids and salts thereof, organic amides, organic imides, organic amines, organic esters, organic anhydrides, organic alcohols, organic acid halides (such as acid chlorides, acid bromides, etc.) organic peroxides, organic silanes, and the like.

Examples of preferred functional groups include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used.

Examples of particularly preferred functional groups include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

In a preferred embodiment, the polymer is grafted with maleic anhydride so the maleic anhydride covalently bonded to the backbone polymer chain of the polymer. The anhydride functionality grafted onto the polymer may remain as an anhydride, may be oxidized into acid functional groups, and/or may be further reacted by processes known in the art to induce other functional groups such as amides, amines, alcohols, and the like.

Multiple methods exist in the art that may be used for functionalizing polymers. These include, but are not limited to, selective oxidation, free radical grafting, ozonolysis, epoxidation, and the like. The functionalized polymer may be produced in a solution or a slurry process (i.e., with a solvent), or in a melt process (i.e., without a solvent). The functionalized polymer may also be prepared in a high shear mixer, a fluidized bed reactor, and/or the like.

Typically, the polymer is combined with a free radical initiator and a grafting monomer at a temperature, and for period of time sufficient to cause grafting of the monomer with the polymer to produce the functionalized polymer. In such an embodiment, the functionalized polymer may be obtained by heating the polymer and a radical polymerizable functional group (e.g., maleic anhydride) in the presence of a radical initiator catalyst such as an organic peroxide. The combination is preferably heated at, near, or above the decomposition temperature of the radical initiator catalyst.

Useful radical initiator catalysts include: diacyl peroxides, peroxy esters, peroxy ketals, dialkyl peroxides, and the like. Specific examples include benzoyl peroxide, methyl ethyl ketone peroxide, tert-butyl peroxy benzoate, tert-butylperoxy acetate, tert-butyl-O-(2-ethylhexyl)monoperoxy carbonate, n-butyl 4,4-di-(tert-butyl peroxy)valerate, 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di(tert-butylperoxy)-hexane, cyclohexanone peroxide, t-butylperoxyisopropyl carbonate, di-ti-butyl perphthalate, 2,5-dimethyl-2,5-di(t-butylperoxy)hexene, 2,5-dimethyl-2,5-di(t-butylperoxy)hexene-3, di-t-butyl peroxide, cumene hydroperoxide, t-butyl hydroperoxide, hydroperoxides, dilauryl peroxide, dicumyl peroxide, and the like. In a preferred embodiment the functionalization is conducted at a temperature above the melting point of the polymer, but below the decomposition temperature of the initiator. Useful temperature ranges include from 35° C. to 350° C., preferably from 40° C. to 250° C., preferably from 45° C. to 200° C.

The radical initiator catalyst is preferably used in a ratio of from 0.00001 to 100% by weight, more preferably from 0.1 to 10% by weight, based on the weight of the functional group. The heating temperature depends upon whether or not the reaction is carried out in the presence of a solvent, but it is usually from about 50° C. to 350° C.

In the solvent based process, the reaction may be carried out using the polymer in the form of a solution (or a slurry having a concentration of from 0.1 to 50% by weight in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms, which is stable to the radicals. Preferred solvents include hexane and cyclohexane.

Various techniques may be used to characterize the functionalized polymers, some of which are described in "Structure Characterization" The Science and Technology of Elastomers, F. Eirich, editor, Academic Press 1978, Chapter 3 by G. Ver Strate which is incorporated by reference.

Preferably, the functionalized polymer comprises maleic anhydride at less than about 50% by weight, preferably less than about 45% by weight, preferably less than about 40% by weight, preferably less than about 35% by weight, preferably less than about 30% by weight, preferably less than about 25% by weight, preferably less than about 20% by weight, preferably less than about 15% by weight, preferably less than about 10% by weight, preferably less than about 9% by weight, preferably less than about 8% by weight, preferably less than about 7% by weight, preferably less than about 6% by weight, preferably less than about 5% by weight, preferably less than about 4% by weight, preferably less than about 3% by weight, preferably less than about 2% by weight maleic anhydride. Also preferably the level of maleic anhydride in the polymer-g-MA may be greater than about 0.1% by weight, preferably greater than about 0.5% by weight, alternately greater than about 1% by weight maleic anhydride. In a preferred embodiment, the functionalized polymer may comprise 0.1 to about 10% by weight of the maleic anhydride, more preferably 0.25 to about 5% by weight more preferably 0.5 to 4,% by weight, more preferably 0.75 to 3.5% by weight, more preferably 1.5 to 2.5% by weight of the maleic anhydride.

The functional group content of the grafted polymer may be determined by Fourier Transformed Infrared spectroscopy based on a calibration with standards whose absolute functional group content has been determined. Specifically, the maleic anhydride content of the grafted polymer may be determined by Fourier Transformed Infrared spectroscopy based on a calibration with standards whose absolute maleic anhydride content has been determined according to the procedure described by M. Sclavons et al. (M. Sclavons, P. Franquinet, V. Carlier, G. Verfaillie, I. Fallais, R. Legras, M. Laurent, and F. C. Thyrion, *Polymer*, 41, 1989 (2000)) wherein a sample of functionalized polymer (polymer-g-MA) is first purified from residual monomer by complete solubilization in xylene followed by re-precipitation in acetone. This precipitated polymer is then dried. Approximately 0.5 g of the re-precipitated polymer is dissolved in 150 ml of toluene at boiling temperature. A potentiometric titration with TBAOH (tetra-butylammonium hydroxide) using bromothymol blue as the color indicator is performed on the heated solution in which the polymers do not precipitate during titration. The polymers are preferably pre-heated to 200° C. for 1 hour prior to dissolution in order to make sure that all diacid resulting from hydrolysis of maleic anhydride with ambient moisture has been converted back to the anhydride.

Polymers useful to make functionalized polymers herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers include polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

Another class of particularly preferred modified, polymers include polymers of a $C_4$ to $C_7$ isoolefin (such as isobutylene) copolymerized with one or more of isoprene, isobutylene modified with maleic acid or maleic anhydride. Particularly preferred functionalized polymer include maleated copolymers of isobutylene and isoprene, maleated copolymers of isobutylene and paramethylstyrne, maleated halobutyl type copolymers, maleated SBB type copolymers and maleated BIMS type copolymers.

In another embodiment, maleic anhydride grafted rubbers useful herein as modified polymers (E) could be maleic anhydride modified or grafted ABS (acrylonitrile-butadiene-styrene), EPDM (ethylene-propylene-diene), SEBS (styrene-ethylene/butadiene-styrene) and others. Other maleated ethylene copolymer rubbers useful as modified polymers (E) include maleated ethylene-propylene, maleated ethylene-butene, maleated ethylene-hexene, maleated ethylene-octene, maleated ethylene-decacene, maleated ethylene-propylene-diene, maleated ethylene-vinyl acetate, maleated ethylene-methyl acrylate, maleated ethylene-ethyl acrylate, maleated ethylene-acylic acid and others. Useful maleated copolymer rubbers also include copolymers of maleic anhydride or its derivatives with one or more comonomers such as ethylene, methacrylate, butyl acrylate, and the like.

Preferred modified polymer compositions useful as the dispersed phase of the thermoplastic polymer composition (B) include functionalized polymer(s) such as halogenated isobutylene based rubbers including halogenated butyl rubber. Halogenated butyl rubber is produced by the halogenation of the butyl rubber. Halogenation can be carried out by any means, and the invention is not herein limited by the halogenation process. Methods of halogenating polymers such as butyl polymers are disclosed in U.S. Pat. Nos. 2,631,984, 3,099,644, 4,288,575, 4,554,326, 4,632,963, 4,681,921, 4,650,831, 4,384,072, 4,513,116 and 5,681,901. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used, as disclosed in U.S. Pat. No. 4,288,575. Useful halogenated butyl rubber typically has a Mooney Viscosity of about 20 to about 70 (ML 1+8 at 125° C.); for example, and about 25 to about 55 in another embodiment. The preferred halogen content is typically about 0.1 to 10% by weight based on the weight of the halogenated rubber; for example, about 0.5 to 5% by weight; alternatively, about 0.8 to about 2.5% by weight; for example, about 1 to about 2% by weight. A particularly preferred form of halogenated butyl rubber contains a high content of the following halogenated structure (preferably 60 to 95% as measured by NMR), where X represents the halogen and, in a particularly preferred embodiment, the halogen is bromine; alternatively the halogen is chlorine:

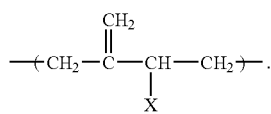

A commercial embodiment of a halogenated butyl rubber useful in the present invention is Bromobutyl 2222 (ExxonMobil Chemical Company). Its Mooney Viscosity is typically about 27 to 37 ($ML_{1+8}$ at 125° C., ASTM 1646, modified), and its bromine content is about 1.8 to 2.2% by weight relative to the Bromobutyl 2222. Furthermore, the cure characteristics of Bromobutyl 2222 as provided by the manufacturer are as follows: MH about 28 to 40 dN m, ML is about 7 to 18 dN m (ASTM D2084). Another commercial embodiment of the halogenated butyl rubber useful in the present invention is Bromobutyl 2255 (ExxonMobil Chemical Company). Its Mooney Viscosity is about 41 to 51 ($ML_{1+8}$ at 125° C., ASTM D1646), and its bromine content is about 1.8 to 2.2% by weight. Furthermore, its cure characteristics as disclosed by the manufacturer are as follows: MH is from 34 to 48 dN m, ML is from 11 to 21 dN m (ASTM D2084). Commercial isobutylene polymers are described in detail by R. N. Webb, T. D. Shaffer and A. H. Tsou, "Commercial Isobutylene Polymers," Encyclopedia of Polymer Science and Technology, 2002, John Wiley & Sons, incorporated herein by reference.

Another useful embodiment of halogenated butyl rubber is halogenated, branched or "star-branched" butyl rubber. These rubbers are described in, for example, EP 0 678 529 B1, U.S. Pat. Nos. 5,182,333 and 5,071,913, each incorporated herein by reference. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in % by weight, typically greater than 0.3% by weight; alternatively, about 0.3 to about 3% by weight; or about 0.4 to 2.7% by weight.

Preferably the branched or "star-branched" butyl rubber used herein is halogenated. In one embodiment, the halogenated star-branched butyl rubber ("HSBB") comprises a butyl rubber, either halogenated or not, and a polydiene or block-copolymer, either halogenated or not. The halogenation process is described in detail in U.S. Pat. No. 4,074,035, U.S. Pat. No. 5,071,913, U.S. Pat. No. 5,286,804, U.S. Pat. No. 5,182,333 and U.S. Pat. No. 6,228,978. The present invention is not limited by the method of forming the HSBB. The polydiene/block (copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in % by weight, typically greater than about 0.3% by weight, alternatively about 0.3 to 3% by weight, or about 0.4 to 2.7% by weight.

A commercial embodiment of HSBB useful in the present invention is Bromobutyl 6222 (ExxonMobil Chemical Company), having a Mooney Viscosity ($ML_{1+8}$ at 125° C., ASTM D1646) of about 27 to 37, and a bromine content of about 2.2 to 2.6% by weight. Further, cure characteristics of Bromobutyl 6222, as disclosed by the manufacturer, are as follows: MH is from 24 to 38 dN·m, ML is from 6 to 16 dN·m (ASTM D2084).

Preferred halogenated isoolefin/para-alkylstyrene copolymers useful herein as a halogenated isobutylene based rubber (useful as the dispersed phase of the thermoplastic polymer composition (B)) include random copolymers comprising isobutylene and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine. The copolymer may also include functionalized interpolymers wherein at least some of the alkyl substituent groups present on the styrene monomer units contain benzylic halogen or another functional group described further below. Preferred isobutylene based rubbers may be characterized as interpolymers containing the following monomer units randomly spaced along the polymer chain:

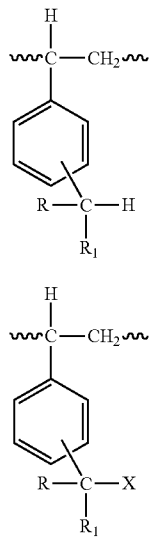

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof, preferably bromine. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the copolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization and cure are more particularly disclosed in U.S. Pat. No. 5,162,445.

Particularly useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (Exxon-Mobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer as measured by gel permeation chromatography (as shown in U.S. Pat. No. 5,162,445). More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5% by weight of bromomethyl groups. In yet another embodiment, the amount of bromomethyl groups is about 0.2 to about 2.5% by weight. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity ($ML_{1+8}$, 125° C., ASTM D1646) is about 30 to about 60 Mooney units.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F=1-\{mA/(1+mA)\}$$

where:
m is the copolymer sequence distribution parameter,
A is the molar ratio of p-alkylstyrene to isoolefin in the copolymer and,
F is the p-alkylstyrene-isoolefin-p-alkylstyrene triad fraction in the copolymer.

The best fit of this equation yields the value of m for copolymerization of the isoolefin and p-alkylstyrene in a particular diluent. In certain embodiments, m is from less than 38; alternatively, from less than 36; alternatively, from less than 35; and alternatively, from less than 30. In other embodiments, m is from 1-38; alternatively, from 1-36; alternatively, from 1-35; and alternatively from 1-30. Copolymers having such characteristics are disclosed in WO 2004058825 and WO 2004058835.

In another embodiment, the isoolefin/para-alkylstyrene copolymer is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection size exclusion chromatography (SEC) as described below. Such polymers are also disclosed in WO 2004058825 and WO 2004058835.

In another embodiment, the relationship between the triad fraction of an isoolefin and a multiolefin and the mol % of multiolefin incorporated into the halogenated rubber copolymer is described by the copolymer sequence distribution equation below and is characterized by the copolymer sequence distribution parameter, m.

$$F = mA/(1+mA)^2$$

where:

m is the copolymer sequence distribution parameter,

A is the molar ratio of multiolefin to isoolefin in the copolymer and,

F is the isoolefin-multiolefin-multiolefin triad fraction in the copolymer.

Measurement of triad fraction of an isoolefin and a multiolefin and the mol % of multiolefin incorporated into the copolymer is described below. The best fit of this equation yields the value of m for copolymerization of the isoolefin and multiolefin in each diluent. In certain embodiments, m is from greater than 1.5; alternatively, from greater than 2.0; alternatively, from greater than 2.5; alternatively, from greater than 3.0; and alternatively, from greater than 3.5. In other embodiments, m is from 1.10 to 1.25; alternatively, from 1.15 to 1.20; alternatively, from 1.15 to 1.25; and alternatively, m is about 1.20. Halogenated rubbers that have these characteristics are disclosed in WO 2004058825 and WO 2004058835.

In another embodiment, the halogenated rubber is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as follows. The presence or absence of long chain branching in the polymers is determined using triple detection SEC. Triple detection SEC is performed on a Waters (Milford, Mass.) 150C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150C). The detectors are connected in series with the light scattering detector being first, the viscometry detector second and the differential refractive index detector third. Tetrahydrofuran is used as the eluent (0.5 ml/min.) with a set of three Polymer Laboratories, Ltd. (Shropshire, United Kingdom) 10 micron mixed-B/LS GPC columns. The instrument is calibrated against 16 narrow polystyrene standards (Polymer Laboratories, Ltd.). Data is acquired with TriSEC software (Viscotek) and imported into WaveMetric's Igor Pro program (Lake Oswego, Oreg.) for analysis. Linear polyisobutylene is used to establish the relationship between the intrinsic viscosity $[\eta]_{linear}$ determined by the viscometry detector) and the molecular weight ($M_w$, determined by the light scattering detector). The relationship between $[\eta]_{linear}$ and $M_w$ is expressed by the Mark-Houwink equation.

$$[\eta]_{linear} = KM_w^\alpha$$

Parameters K and α are obtained from the double-logarithmic plot of intrinsic viscosity against $M_w$, α is the slope, K the intercept. Significant deviations from the relationship established for the linear standards indicate the presence of long chain branching. Generally, samples which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in "Comprehensive Polymer Science," Vol. 2, (71-120) G. Allen and J. C. Bevington, Ed., Pergamon Press, New York, 19.88. In triple detection SEC, a g' is calculated for each data slice of the chromatographic curve. A viscosity average g' or $g'_{vis.avg.}$ is calculated across the entire molecular weight distribution. The scaling factor $g'_{vis.avg.}$ is calculated from the average intrinsic viscosity of the sample:

$$g'_{vis.avg.} = [\eta]_{avg.}/(KM_w^\alpha)$$

Other preferred halogenated elastomers or rubbers useful as the dispersed phase of the thermoplastic polymer composition (B) include halogenated isobutylene-p-methylstyrene-isoprene copolymer as described in WO 01/21672A1.

Preferred polyamides usable as the matrix (D) in the thermoplastic polymer composition (B) are thermoplastic polyamides (nylons) comprising crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable for use as the matrix (D) in the thermoplastic polymer composition (B).

Examples of such polyamides are polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6IP), Nylon 46, Nylon MXD6, Nylon 6/66 and the condensation product of 11-aminoundecanoic acid (Nylon 11). Nylon 6 (N6), Nylon 11 (N11), Nylon 12 (N12), a Nylon 6/66 copolymer (N6/66), Nylon 610 (N610), Nylon 46, Nylon MXD6, Nylon 69 and Nylon 612 (N612) may also be used. The copolymers thereof any blends thereof may also be used. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention as the matrix (D) in the thermoplastic polymer composition (B), with linear crystalline polyamides having a softening point or melting point between 160° C.-230° C. being preferred.

In an alternate embodiment, the amounts of the modified polymer (E) (preferably a halogenated copolymer of isobutylene and paramethyl styrene) and the thermoplastic resin matrix (D) (preferably a polyamide) usable in the present invention are preferably 95 to 25 parts by weight and 5 to 75 parts by weight, more preferably 90 to 25 parts by weight and 10 to 75 parts by weight, respectively, provided that the total amount thereof is 100 parts by weight.

In a preferred embodiment, the thermoplastic polymer composition (B) according to the present invention (which comprises a modified polymer (such as a modified rubber)

component dispersed in a thermoplastic resin matrix (such as a polyamide)) is subjected to a dynamic vulcanization.

The term "dynamic vulcanization" is used herein to connote a vulcanization process in which the polyamide resin and the first rubber component are vulcanized under conditions of high shear. As a result, the first vulcanizable rubber component is simultaneously vulcanized and dispersed as fine particles of a "micro gel" within the polyamide resin matrix.

The dynamic vulcanization is effected by mixing the ingredients at a temperature which is at or above the curing temperature of the rubber in an equipment such as a roll mill, Banbury® mixer, continuous mixer, kneader or mixing extruder, e.g., a twin screw extruder. The unique characteristic of the dynamically vulcanized composition is that, notwithstanding the fact that the rubber component may be partially or fully vulcanized, the composition can be processed and reprocessed by a conventional rubber processing technique such as extrusion, injection molding, compression molding, etc. Scrap or flashing can be salvaged and reprocessed.

The method for producing the thermoplastic polymer composition (B) in the present invention typically comprises mixing the first rubber component, the polyamide and the optional dispersion aid by a biaxial kneader/extruder etc. to disperse the rubber in the polyamide forming the continuous phase. When vulcanizing the modified polymer (E), a vulcanization agent can be added, while mixing, and the modified polymer (E) is dynamically vulcanized. Further, the various compounding agents (except vulcanization agent) for the modified polymer (E) and the thermoplastic resin (E) (e.g. polyamide) may be added during the above kneading, but preferably are mixed in advance before the kneading. The kneader used for mixing is not particularly limited. Examples thereof are a screw extruder, kneader, Banbury mixer, biaxial kneader/extruder, etc. Among these, it is preferable to use a biaxial kneader/extruder for the mixing of the thermoplastic resin (E) and the modified polymer (D) and the dynamic vulcanization of the modified polymer (D). Further, two or more types of kneaders may be used for successive kneading. As the conditions for the melting and kneading, the temperature should be at least the temperature where the thermoplastic resin (D) (e.g. polyamide) melts. Further, the shear rate at the time of kneading is preferably 1000 to 7500 $sec^{-1}$. The time for the overall kneading is from 30, seconds to 10 minutes. Further, when adding a vulcanization agent, the vulcanization time after addition is preferably 30 seconds to 5 minutes. The thermoplastic polymer (B) composition produced by the above method is then typically extruded or calendered into a film. The method of forming the film may be a usual method of forming a film from a thermoplastic resin or thermoplastic elastomer.

The thermoplastic polymer composition (B) according to the present invention may contain a vulcanization or cross-linking agent, a vulcanization or cross-linking accelerator, various types of oils, an antiaging agent, reinforcing agent, plasticizer, softening agent, or other various additives generally mixed into general rubbers. The compounds are mixed and vulcanized by general methods to make the composition which may then be used for vulcanization or cross-linking. The amounts of these additives added may be made the amounts generally added in the past so long as they do not run counter to the object of the present invention.

In another embodiment, the composition of the present invention comprises a laminate comprising three or more layers. In a preferred embodiment the laminate comprises a first layer of a dynamically vulcanized alloy (comprising a polyamide matrix and a modified polymer dispersed phase, preferably a halogenated isoutylene based rubber dispersed phase), a second layer of EVOH copolymer, and a third layer of another a dynamically vulcanized alloy (comprising a polyamide matrix and a modified polymer dispersed phase, preferably a halogenated isoutylene based rubber dispersed phase) which may the same or different as the dynamically vulcanized alloy in the first layer. In some embodiments (the second layer is sandwiched between the first and third layers and optionally the third layer is in contact with a tire, typically a tire carcass, or adhesive layer applied to a tire carcass. Preferably the first layer is from 10 to 100 µm thick, preferably from 30 to 60 µm, preferably 35 to 45 µm thick. Preferably the second layer is from 0.1 to 100 µm thick, preferably from 0.5 to 25 µm, preferably 0.5 to 10 µm thick. Preferably the third layer is from 10 to 100 µm thick, preferably from 30 to 60 µm, preferably 35 to 45 µm thick. In other embodiments, the first layer is from 10 to 100 µm thick, preferably from 10 to 80 µm, preferably 10 to 60 µm thick. In other embodiments, the second layer is from 0.1 to 100 µm thick, preferably from 0.3 to 25 µm, preferably from 0.5 to 5 µm thick. In other embodiments, the third layer is from 10 to 100 µm thick, preferably from 10 to 80 µm, preferably 10 to 60 µm thick. In some embodiments the first and third layers are the same thickness. In alternate embodiments the first and third layers are different thicknesses. In a preferred embodiment, the first layer is 10 to 60 µm thick, the second layer is 0.5 to 5 µm thick and the third layer is 10 to 60 µm thick.

In a useful embodiment the dynamically vulcanized alloy ("DVA") present in the first or third layer comprises a polyamide matrix as described above, preferably selected from the group consisting of polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6IP), Nylon 46, Nylon MXD6, Nylon 6/66, the condensation product of 11-aminoundecanoic acid (Nylon 11), and Nylon 612 (N612).

In a useful embodiment the dynamically vulcanized alloy ("DVA") present in the first or third layer comprises a modified polymer as described above present as the dispersed phase, preferably a halogenated isoutylene based rubber as described above present as a dispersed phase.

Other DVA's useful as the first and or third layers are those disclosed in WO 2004/081107, WO 2004/081106, WO 2004/081108, WO 2004/081116, and WO 2004/081099.

Preferred DVA's for use herein typically have a melt viscosity of 500 to 2,000 Pa·s, and or a Young's modulus at room temperature of 1 to 400 MPa and or an elongation to break greater than 150% at room temperature.

Preferred modified polymers (E) useful in the first and or third layer comprise polymers having a melt viscosity of 500-2000 Pa·s, preferably 600-1800 Pa·s, more preferably 700-1700 Pa·s and a Young's modulus at a room temperature of 1-400 MPa, preferably 5-350 MPa, more preferably 10-300 MPa.

Preferred thermoplastic resin (A) (preferably EVOH copolymers) useful in the second layer typically comprise EVOH copolymers having from 15 to 60 mol % ethylene, preferably 20 to 55 mol % ethylene, preferably 25 to 50 mol % ethylene.

Preferred thermoplastic resin (A) (preferably EVOH copolymers) useful in the second layer typically comprise EVOH copolymers having a melting point form 145 to 250° C., preferably from 150 to 240° C., more preferably for 155 to 230° C.

Preferred thermoplastic resin (A) (preferably EVOH copolymers) useful in the second layer typically comprise EVOH copolymers having a permeability to air of $0.05 \times 10^{-12}$ cc·cm/cm²·s·cMHg or less, preferably $0.03 \times 10^{-12}$ cc·cm/cm²·s·cmHg or less, preferably $0.01 \times 10^{-12}$ cc·cm/cm²·s·cmHg or less.

The laminate (preferably a three layer structure as described above) typically has an air permeation coefficient of $20 \times 10^{-12}$ cc·cm/cm²·sec·cmHg or less, preferably $10 \times 10^{-12}$ cc·cm/cm²·sec·cmHg or less, and preferably having a Young's modulus of 1 to 500 MPa and or an elongation to break greater than 150% at room temperature.

Since the thermoplastic resin matrix (D) (e.g. polyamide) and the modified polymer (E) (e.g. halogenated rubber) typically differ significantly in solubility, a further optional compatibilizing ingredient may be useful for the purposes of enhancing compatibility of these polymers. Such compatibilizers include ethylenically unsaturated nitrile-conjugated diene-based high saturation copolymer rubbers (HNBR), epoxylated natural rubbers (ENR), NBR, hydrin rubbers, acryl rubbers and mixtures thereof. Compatibilizers are thought to function by modifying, in particular reducing, the surface tension between the rubber and resin components. Other compatibilizers include copolymers such as those having the structure of both or one of a polyamide and rubber polymer or a structure of a copolymer having an epoxy group, carbonyl group, halogen group, amine group, maleated group, oxazoline group, hydroxy group, etc. capable of reacting with the polyamide or rubber polymer. These may be selected based upon the type of the polyamide and rubber polymer to be mixed, but useful copolymers typically include, e.g., a styrene/ethylene-butylene/styrene block copolymer (SEBS) and its maleic acid-modified form; EPDM, EPDM/styrene, or EPDM/acrylonitrile graft copolymer and their maleic acid-modified forms; styrene/maleic acid copolymer; reactive phenoxy thermoplastic resin; and their mixtures. The amount of the compatibilizer blended is not particularly limited, but, when used, typically is about 0.5 to about 10 parts by weight, based upon 100 parts by weight of the polymer component, in other words, the total of the polyamide and rubber polymer.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed (during the vulcanization reaction. (See, e.g., Helt et al., *The Post Vulcanization Stabilization for NR*, Rubber World 18-23 (1991). Curing agents include those components described above that facilitate or influence the cure of elastomers, and generally include metals, metal oxides, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be crosslinked by adding curative agents, for example sulfur, metal oxides (i.e., zinc oxide, ZnO), organometallic compounds, radical initiators, etc. and heating the composition or mixture.

When the method known as "dynamic vulcanization" is used, the process of dispersing the cure system is modified as described in detail hereinafter. Generally, the term "dynamic vulcanization" is used to denote a vulcanization process in which a thermoplastic or engineering resin (i.e. the polyamide) and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the polyamide which forms a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the polyamide, using equipment such as roll mills, Banbury® mixers, continuous mixers, kneaders, or mixing extruders (such as twin screw extruders). The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. (See, e.g., U.S. Pat. No. 6,079,465 and the references cited therein.)

The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. (See also, *Formulation Design and Curing Characteristics of NBR Mixes for Seals*, Rubber World 25-30 (1993). To the curative agent(s) there are often added accelerators for the vulcanization of elastomer compositions. The curing agent(s), with or without the use of at least one accelerator, is often referred to in the art as a curing "system" for the elastomer(s). A cure system is used because typically more than one curing agent is employed for beneficial effects, particularly where a mixture of high diene rubber and a less reactive elastomer is used. Furthermore, because the present invention employs a DVA process, it is necessary that the properties of the cure system are adapted to the mixing process. Typically the first, or if there are more than two stages of rubber addition, then in a preceding stage, rubber(s) are cured to a level of about 50% of the maximum cure which the particular rubber(s) and cure system are capable of reaching at the temperature of cure if measured independently of the dynamic vulcanization process in a time period that is less than about the mixer residence time. For example, in order to determine the cure response of the particular rubber(s) present in a composition, the rubber(s) and cure system can be combined by means known to those skilled in the art, e.g., on a two-roll mill, Banbury mixer or mixing extruder. A sample of the mixture, often referred to as the "accelerated" compound, can be cured under static conditions, such as in the form of a thin sheet using a mold that is subjected to heat and pressure in a press. Samples of the accelerated compound, cured as thin pads for progressively longer times and/or at higher temperatures, are then tested for stress strain properties and/or crosslink density to determine the state of cure (described in detail in American Society for Testing and Materials, Standard ASTM D412). Alternatively, the accelerated compound can be tested for state of cure using an oscillating disc cure rheometer test (described in detail in American Society for Testing and Materials, Standard ASTM D2084). Having established the maximum degree of cure, it is preferable to dynamically vulcanize the first or preceding stage rubber(s) added to the dynamically vulcanizable mixture to the extent that the degree of cure of such rubber(s) is selected from the group consisting of about 50%, for example, about 60% to greater than about 95%; about 65% to about 95%; about 70% to about 95%; about 75% to greater than about 90%; about 80% to about 90%; in a time period less than or substantially equivalent to about the residence time of the mixer used for dynamic vulcanization. Consequently, at the conclusion of the dynamic vulcanization process, the vulcanizable rubbers added to the composition are sufficiently cured to achieve the desired properties of the thermoplastic composition of which they are a part, e.g., a fluid (air or liquid) retention barrier such as a innerliner for a tire. For purposes of the present invention, such state of cure can be referred to as "substantially fully cured."

It will be appreciated that the vulcanizable rubbers will be cured to at least 50% of the maximum state of cure of which they are capable based on the cure system, time and temperature, and typically, the state of cure of such rubbers will exceed 50% of maximum cure. Further, it may also be desirable to cure the rubber particles to less than the maximum state of cure of which the rubber is capable so that the flexibility, as measured, for example, by Young's modulus, of the rubber component is at a suitable level for the end-use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

For purposes of dynamic vulcanization in the presence of an engineering resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when there is present one or more thermoplastic engineering resins such that peroxide would cause such resins themselves to crosslink. In that circumstance, if the polyamide would itself vulcanize or crosslink, it would result in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux (the di-ortho-tolylguanidine salt of dicatechol borate); HVA-2 (m-phenylene bis maleimide); Zisnet (2,4,6-trimercapto-5-triazine); ZDEDC (zinc diethyl dithiocarbamate) and also including for the purposes of the present invention, other dithiocarbamates; Tetrone A (dipentamethylene thiuram hexasulfide); Vultac 5 (alkylated phenol disulfide); SP1045 (phenol formaldehyde resin); SP1056 (brominated alkyl phenol formaldehyde resin); DPPD (diphenyl phenylene diamine); salicylic acid, ortho-hydroxy benzoic acid; wood rosin, abietic acid; and TMTDS (tetramethyl thiuram disulfide), used in combination with sulfur.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally all of the available curative is consumed in the formation of effective crosslinks which join individual polymer chains to one another and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and the cure systems of which they are a part that are useful with one or more crosslinkable polymers are well-known in the art. The cure system can be dispersed in a suitable concentration into the desired portion of the rubber component, the rubber component optionally containing one or more filler, extender and/or plasticizer by, e.g., mixing the rubber and the cure system components in a step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization.

In one embodiment of the invention, at least one curing agent is typically present at about 0.1 to about 15 phr; alternatively at about 0.25 to about 10 phr.

Useful combinations of curatives, cure modifiers and accelerators can be illustrated as follows: As a general rubber vulcanization agent, e.g., a sulfur vulcanization agent, powdered sulfur, precipitated sulfur, high dispersion sulfur, surface-treated sulfur, insoluble sulfur, dimorpholinedisulfide, alkylphenoldisulfide, and mixtures thereof are useful. Such compounds may be used in an amount of about 0.5 phr to about 4 phr (parts by weight per 100 parts by weight of the elastomer component). Alternatively, where the use of such a material is feasible in view of other polymer and resin components present an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di(peroxylbenzoate), and mixtures thereof. When used, such curatives can be present at a level of about 1 phr to about 20 phr. Other useful curatives include phenol resin vulcanization agents such as a bromide of an alkylphenol resin or a mixed crosslinking agent system containing stannous chloride, chloroprene, or another halogen donor and an alkylphenol resin and mixtures thereof. Such agents can be used at a level of about 1 phr to about 20 phr. Alternatively, other useful curing agents, cure modifiers and useful levels include zinc oxide and/or zinc stearate (about 0.05 phr to about 5 phr), stearic acid (about 0.1 phr to about 5 phr), magnesium oxide (about 0.5 phr to about 4 phr), lyserge (10 to 20 phr or so), p-quinonedioxime, p-dibenzoylquinonedioxime, tetrachloro-p-benzoquinone, poly-p-dinitrosobenzene (about 0.5 phr to about 10 phr), methylenedianiline (about 0.05 phr to about 10 phr), and mixtures thereof. Further, if desired or necessary, one or more of a vulcanization accelerator may be added in combination with the vulcanization agent, including for example, an aldehyde-ammonia, guanidine, thiazole, sulfenamide, thiuram, dithio acid salt, thiurea, and mixtures thereof, for example, in an amounts of about 0.1 phr to about 5 phr or more.

The laminate composition described herein (including each layer) may also have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black (described, for example, in U.S. Pat. No. 5,916,934, incorporated herein by reference), and the like. Reinforcing grade carbon black is preferred. The filler may also include other reinforcing or non-reinforcing materials such as silica, clay, calcium carbonate, talc, titanium dioxide and the like. The filler may be present at a level of from 0 to about 30% by weight of the rubber present in the composition.

Exfoliated, intercalated, or dispersed clays may also be present in the laminate composition or in one or all of the layers thereof. These clays, also referred to as "nanoclays", are well known, and their identity, methods of preparation and blending with polymers is disclosed in, for example, JP 2000109635, JP 2000109605, JP 11310643; DE 19726278; WO98/53000; and U.S. Pat. Nos. 5,091,462, 4,431,755, 4,472,538, and 5,910,523. Swellable layered clay materials suitable for the purposes of the present invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness typically about 4 to about 20 Å in one embodiment, and about 8 to about 12 Å in another embodiment, bound together and containing exchangeable cations such as $Na^+$, $Ca^{+2}$, $K^+$ or $Mg^{+2}$ present at the interlayer surfaces.

Layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls or alkenes which may be the same or different. In one embodiment, the exfoliating agent is a so-called long chain tertiary amine, wherein at least $R_1$ is a $C_{12}$ to $C_{20}$ alkyl or alkene.

Another class of swelling agents include those which can be covalently bonded to the interlayer surfaces. These include polysilanes of the structure $-Si(R')_2R^2$ where R' is the same or different at each occurrence and is selected from alkyl, alkoxy or oxysilane and $R^2$ is an organic radical compatible with the matrix polymer of the composite. Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 and WO92/02582.

In a preferred embodiment of the invention, the exfoliating or swelling agent is combined with a halogenated polymer. In one embodiment, the agent includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, dihydrogenated tallowalkyl-methylamine and the like, and amine-terminated polytetrahydrofuran; long-chain thiol and thiosulfate compounds such as hexamethylene sodium thiosulfate. In another embodiment of the invention, improved interpolymer impermeability is achieved by the use of polyfunctional curatives such as hexamethylene bis(sodium thiosulfate) and hexamethylene bis(cinnamaldehyde).

The amount of exfoliated, intercalated, or dispersed clay incorporated in the composition in accordance with this invention is an amount sufficient to develop an improvement in the mechanical properties or barrier properties of the composition, e.g. tensile strength or air/oxygen permeability. Amounts typically can be from about 0.5 to about 15% by weight in one embodiment, or about 1 to about 10% by weight in another embodiment, and about 1 to about 5% by weight in yet another embodiment, based on the polymer content of the composition. Expressed in parts per hundred rubber, the exfoliated, intercalated, or dispersed clay may be present at about 1 to about 30 phr in one embodiment, and about 3 to about 20 phr in another embodiment. In one embodiment, the exfoliating clay is an alkylamine-exfoliating clay.

As used herein, the term "process oil" means both the petroleum derived process oils and synthetic plasticizers. A process or plasticizer oil may be present in air barrier compositions. Such oils are primarily used to improve the processing of the composition during preparation of the layer, e.g., mixing, calendering, etc. Suitable plasticizer oils include aliphatic acid esters or hydrocarbon plasticizer oils such as paraffinic or naphthenic petroleum oils. The preferred plasticizer oil for use in standard, non-DVA, non-engineering resin-containing innerliner compositions is a paraffinic petroleum oil; suitable hydrocarbon plasticizer oils for use in such innerliners include oils having the following general characteristics.

| Property | Preferred | Minimum | Maximum |
|---|---|---|---|
| API gravity at 60° F. (15.5° C.) | 15-30 | 10 | 35 |

-continued

| Property | Preferred | Minimum | Maximum |
|---|---|---|---|
| Flash Point, (open cup method) ° F. (° C.) | 330-450 (165-232° C.) | 300 (148° C.) | 700 (371° C.) |
| Pour Point, ° F. (° C.) | 30 to +30 (−34 to −1° C.) | −35 (−37° C.) | 60 (15° C.) |

Generally, the process oil may be selected from paraffinic oils, aromatic oils, naphthenic oils, and polybutene oils. Polybutene process oil is a low molecular weight (less than 15,000 Mn) homopolymer or copolymer of olefin-derived units having from about 3 to about 8 carbon atoms, more preferably about 4 to about 6 carbon atoms. In another embodiment, the polybutene oil is a homopolymer or copolymer of a $C_4$ raffinate. Low molecular weight "polybutene" polymers is described in, for example, Synthetic Lubricants and High-Performance Functional Fluids 357-392 (Leslie R. Rudnick & Ronald L. Shubkin, ed., Marcel Dekker 1999) (hereinafter "polybutene processing oil" or "polybutene"). Useful examples of polybutene oils are the PARAPOL™ series of processing oils (previously available from ExxonMobil Chemical Company, Houston Tex., now available from Infineum International Limited, Milton Hill, England under the "INFINEUM c, d, f or g tradename), including grades previously identified as PARAPOL™ 450, 700, 950, 1300, 2400, and 2500. Additionally preferred polybutene oils are SUNTEX™ polybutene oils available from Sun Chemicals. Preferred polybutene processing oils are typically synthetic liquid polybutenes having a certain molecular weight, preferably from about 420 Mn to about 2700 Mn. The molecular weight distribution -Mw/Mn- ("MWD") of preferred polybutene oils is typically about from 1.8 to about 3, preferably about 2 to about 2.8. The preferred density (g/ml) of useful polybutene processing oils varies from about 0.85 to about 0.91. The bromine number (CG/G) for preferred polybutene oils ranges from about 40 for the 450 Mn process oil, to about 8 for the 2700 Mn process oil.

Rubber process oils also have ASTM designations depending on whether they fall into the class of paraffinic, naphthenic or aromatic hydrocarbonaceous process oils. The type of process oil utilized will be that customarily used in conjunction with a type of elastomer component and a rubber chemist of ordinary skill in the art will recognize which type of oil should be utilized with a particular rubber in a particular application. For an innerliner composition the oil is typically present at a level of 0 to about 25% by weight; preferably about 5 to 20% by weight of the total composition. For a thermoplastic elastomer composition the oil may be present at a level of 0 to about 20% by weight of the total composition; preferably oil is not included in order to maximize impermeability of the composition.

In addition, plasticizers such as organic esters and other synthetic plasticizers can be used. A particularly preferred plasticizer for use in a DVA composition is N-butylsulfonamide or other plasticizers suitable for polyamides. In another embodiment, rubber process oils such as naphthenic, aromatic or paraffinic extender oils may be present at about 1 to about 5 phr. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 2 phr in the composition.

The degree of cure of the vulcanized rubber can be described in terms of gel content, cross-link-density, the amount of extractable components or it can be based on the state of cure that would be achieved in the rubber were it to be cured in the absence of the resin. For example, in the present invention, it is preferred that the halogenated elastomer achieve about 50 to about 85% of full cure based on the elastomer per se as measured, e.g., by tensile strength or using the oscillating disc cure meter test (ASTM D 2084, Standard Test Method for Rubber Property-Vulcanization Using Oscillating Disk Cure Meter).

By molding the thermoplastic polymer composition obtained into a sheet, film, or tube using a T-sheeting die, straight or crosshead structure tubing die, inflation molding cylindrical die, etc. at the end of a single-screw extruder, or by calendering, then laminating to a thermoplastic resin (A) it is possible to use the composition as the air permeation preventive layer, e.g., an innerliner, of a pneumatic tire and as a component or layer of a hose, etc.

The laminate sheet or laminate tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited.

EXAMPLES

The present invention will now be further illustrated by, but is by no means limited to, the following Examples.

The following starting materials were used in the following Examples and Comparative Examples.

1. Low Air Permeation Thermoplastic Resin (A)

See Table I below.

2. Thermoplastic Polymer (B)

See Table II below.

3. Adhesive Composition (F)

See Table V below.

TABLE I

Low Air Permeation Thermoplastic Resin (A)

| Resin | Source Material | Air Permeation Coefficient ($\times 10^{-12}$ cc · cm/cm$^2$ · s · cmHg) |
|---|---|---|
| EVOH | Ethylene-Vinyl Alcohol Copolymer (Eval L17B, Kuraray) | 0.002 |
| PA6 | Nylon 6 (Amiran CM1041, Toray) | 0.42 |
| PA11* | Nylon 11 (Rilsan BESNOTL, Atochem) | 10 |

*Comparative Example

TABLE II

Thermoplastic Polymer (B)

| Starting Polymer | Source Material | Young's Modulus (MPa) |
|---|---|---|
| PA6.66 | Nylon 6.66 Copolymer (UBE 5033B, Ube Ind.) | 1100 |
| PA6.66 | Nylon 6.66 Copolymer (UBE 5013B, Ube Ind.) | 1100 |
| PA11 | Nylon 11 (Rilsan BESNOTL, Atochem) | 620 |
| PA11 | Nylon 11 (Rilsan BMNO, Atochem) | 630 |
| PA12 | Nylon 12 (UBESTA 3030XA, Ube Ind.) | 940 |
| ESBS | Epoxidized Styrene-Butadiene-Styrene Copolymer styrene content of 40% by weight, Oxirane Oxygen Content is 1.5 wt % (Epofriend AT501, Daicel Chemical Ind.) | 720 |
| SBS | Styrene-Butadiene-Styrene Copolymer (Tufprene 315, Asahi Chemical) Reported by Asahi Kasei to have about 20/80 styrene/butadiene wt %, an MFR (ASTM 1238, 190° C., 2.16 kg) of 3.5 g/10 min. | 74 |
| Br-IPMS | Brominated Isobutyrene-p-Methylstyrene Copolymer 0.75% Br, 5% PMS, (Exxpro™ MDX89-4, Exxon Mobil Chemical) | 4.2 |
| Mah-EP | Maleic Anhydride Modified Ethylene-Propylene Copolymer WITH maleic anhydride content of 1.0 wt % (MP0610, Mitsui Chemical) | 11 |
| Mah-EB | Maleic Anhydride Modified Ethylene-1-Butene Copolymer with maleic anhydride content of 0.5 wt % (MA8510, Mitsui Chemical) | 38 |
| Mah-EO1 | Maleic Anhydride Modified Ethylene-1-Octene Copolymer Tg = −47° C., Maleic anhydride level between 0.2 to 0.5 wt %, MFI (ASTM 1238 5 kg/230° C.) of 8.0 dg/min (Exxelor VA1840, Exxon Mobil Chemical) | 30 |
| Mah-EO2 | Maleic Anhydride Modified Ethylene-1-Octene Copolymer Tg = −57° C., Maleic anhydride level between 0.5 to 1.0 wt %, MFR (ASTM 1238 2.16 kg/230° C.) of 3 dg/min (Exxelor VA1803, Exxon Mobil Chemical) | 7.1 |
| EPDM | Ethylene-Propyrene-Diene Rubber (ESPRENE 305, Sumitomo Chemical) | 3.1 |
| Carbon Black | FEF (SEAST 116, Tokai Carbon) | — |
| St-Acid | Stearic acid (Bead Stearic Acid, NOF) | — |
| Tackifier | YS Resin D105 having a softening point of _105° C. (Yasuhara Chemical) | — |
| Plasticizer | n-butylbenzene Sulfoneamide (BM-4, Daihachi Chemical Ind.) | — |

3. Matrix of Thermoplastic Resin Composition (D)

Two types of the thermoplastic resin composition matrixes (i.e., BESNOTL B14 and 5033B B14) were prepared (see Table III).

TABLE III

Matrix

| Material Formulation (wt. part) | BESNOTL B14 | 5033B B14 |
|---|---|---|
| BESNOTL*[1] | 100 | — |
| 5033B*[2] | — | 100 |
| Plasticizer*[3] | 16.3 | 16.3 |
| Total (phr) | 116.3 | 116.3 |

*[1]see PA11 (see Table II)
*[2]PA6-66 (see Table II)
*[3]see Table II

4. Preparation of Compounds 1 and 2

Compounds 1 and 2 were prepared by mixing the components listed in Table IV using a Banbury mixer under the conditions of 120° C. for 10 minutes.

TABLE IV

| Material Formulation (wt. part) | Compound 1 | Compound 2 |
|---|---|---|
| Br-IPMS*[1] | 100 | — |
| Carbon Black*[1] | 80 | — |
| St-Acid*[1] | 1 | — |
| ESBS*[1] | — | 50 |
| SBS*[1] | — | 50 |
| Tackifier*[1] | — | 30 |
| Total (phr) | 183.5 | 130 |

*[1]See Table II

TABLE V

Adhesive (F)

| Material Formulation (wt. part) | Adhesive |
|---|---|
| ESBS*[1] | 100 |
| Tackifier*[1] | 30 |
| St-Acid*[1] | 1 |
| Peroxide*[1] | 2 |
| ZnO*[1] | 0.5 |
| Total (phr) | 133.5 |

*[1]see Table II

Adhesive Compound (F)

The adhesive compound shown in Table V below were mixed using a twin screw kneader at 100° C. for 3 minutes. The resultant mixture was pelletized by a conventional rubber pelletizer to obtain pellets of the thermoplastic adhesive composition (F).

Examples 1-13 and Comparative Examples 1-6

The components shown in Tables VI and VII below were mixed using a twin screw kneader at 230° C. for 3 minutes.

The resultant mixture was pelletized by a conventional rubber pelletizer to obtain pellets of the thermoplastic polymer composition (B). The Young's Modulus and the melt viscosities were determined as follows. The results are shown in Tables VI and VII.

Young's Modulus: Young's Modulus was determined according to JIS K6251 "Test Method for Tensile Properties of Vulcanized Rubber" method. Samples of the film prepared by extrusion in the Examples were used and punched into JIS No. 3 dumbbell shapes in the direction of flow of the thermoplastic resin at the time of extrusion.

A tangent was drawn against the curve of the initial strain region of the stress-strain curve obtained and the Young's modulus was found from the inclination of the tangent.

Melt Viscosity:

The melt viscosity means the melt viscosity of any temperature or component at the time of mixing. The melt viscosity of each polymer material is dependent on the temperature, the shear rate ($sec^{-1}$) and the shear stress, so the stress and shear rate of the polymer material at any temperature in the molten state capable of flowing through a capillary, in particular, the temperature region at the time of mixing, are measured and the melt viscosity is measured by the following formula:

$$\eta = \sigma/\dot{\gamma}$$

where $\sigma$ is a shear stress and, $\dot{\gamma}$ is a shear rate.

Note that, the melt viscosity was measured by using a Capillary Rheometer Capillograph 1C made by Toyo Seiki using an orifice having a diameter of 1 mm and length of 10 mm.

The pellets of the thermoplastic polymer composition (B) obtained above were laminated with the polymer (A) shown in Table VI by the melt inflation extrusion with a four layer inflation molding machine to a cylindrical four layers of (B)/(A)/(B)/adhesive(F) and shown in Table VII by the melt inflation extrusion with a three layer inflation molding machine to a cylindrical four layers of (B)/(A)/adhesive(F).

The total gauge of the laminate film is preferably controlled to about 100 μm. The gauge (or thickness) of the layer (A) of the resultant laminate was determined by observing the cross-section of the laminate film using SEM. The results are shown in Tables VI and VII. The evaluation of the resultant laminates when used as an inner liner layer of a pneumatic tire were carried out as follows.

Air Permeation Coefficient of Resin Composition and Laminate: This was performed based on JIS K7126 "Test Method of Gas Permeation Degree of Plastic Films and Sheets (Method A)".

The piece: Laminate samples prepared in the Examples were used.

Test gas: Air ($N_2:O_2=8:2$)

Test temperature: 30° C.

The results are shown in Tables VI and VII.

Indoor Running Test: A 165SR13 steel radial tire was produced, assembled over a rim of 13×4½-J size, filled to an air pressure of 200 kPa, mounted on a 1500 cc class passenger car, then run on an actual road for 20,000 km with a load corresponding to four passengers (65 kg/passenger).

After this operation, the tire was detached from the rim and the liner layer at the inside surface of the tire was visually inspected. Tires with cracks in the liner layer were judged in Tables VI and VII.

Air Leakage Test (Pressure Prop)

The tire was allowed to stand for 3 months under conditions of an initial pressure of 200 kPa, room temperature of 21° C. and no load. The inner pressure was measured at intervals of four days and the α value found by recurrence to the formula:

$$Pt/Po = \exp(-\alpha t)$$

where Pt is the measured pressure, Po is the initial pressure, and t is the days elapsed.

The results obtained are evaluated as follows.

G (Good) . . . <2.5%/month

F (Fair) . . . 2.5%/month<Air leakage<4.0%/month

P (Poor) . . . >4.0%/month

TABLE VI

|  | Comp. Ex. 1 | Comp. Ex. 2 | Ex. 1 | Ex. 2 | Ex. 3 | Ex. 4 | Ex. 4' | Ex. 5 | Ex. 6 | Comp. Ex. 3 | Comp. Ex. 4 | Comp. Ex. 5 | Comp. Ex. 6 |
|---|---|---|---|---|---|---|---|---|---|---|---|---|---|
| Formulation (wt. part) of Polymer (B) | | | | | | | | | | | | | |
| 5033B (PA6.66) | 100 | — | — | — | — | — | — | — | — | — | — | — | — |
| BESNOTL B14 (PA11) | — | — | 33 | 30 | 27 | 27 | 27 | 24 | 27 | 27 | 27 | 27 | — |
| 5033B B14 (PA6.66) | — | — | 22 | 20 | 18 | 18 | 18 | 16 | 18 | 18 | 18 | 18 | — |
| 5013B (PA6.66) | — | 40 | — | — | — | — | — | — | — | — | — | — | — |
| MP0610 (Mah-EP) | — | — | 45 | — | — | — | — | — | — | 55 | — | — | — |
| VA1840 (Mah-EO) | — | — | — | 50 | — | — | — | — | — | — | — | — | — |
| VA1803 (Mah-EO) | — | — | — | — | 55 | — | — | — | 55 | — | 55 | 55 | — |
| ExxproMDX89-4 (Br-IPMS) | — | — | — | — | — | 55 | 55 | — | — | — | — | — | — |
| MA8510 (Mah-EB) | — | — | — | — | — | — | — | 60 | — | — | — | — | — |
| Sumitomo EPDM (EPDM) | — | 60 | — | — | — | — | — | — | — | — | — | — | — |
| Stearic-Acid | | | | | | | 0.33 | | | | | | |
| Zinc stearate | — | — | — | — | — | — | 0.17 | — | — | — | — | — | — |
| Zinc oxide | — | — | — | — | — | — | 0.08 | — | — | — | — | — | — |
| Compound 1 | — | — | — | — | — | — | — | — | — | — | — | — | 100 |
| Evaluation Result of Polymer (B) | | | | | | | | | | | | | |
| Young's Modulus (MPa) | 1100 | 152 | 145 | 85 | 102 | 98 | 98 | 62 | 102 | 114 | 102 | 102 | 7.1 |
| Melt Viscosity (Pa · s) | 1150 | 73 | 640 | 750 | 820 | 540 | 580 | 1240 | 540 | 540 | 790 | 790 | 2320 |

TABLE VI-continued

| Polymer (A) | EVOH | EVOH | EVOH | EVOH | EVOH | EVOH | EVOH | EVOH | PA6 | EVOH | PA11 | PA11 | EVOH *1 |
|---|---|---|---|---|---|---|---|---|---|---|---|---|---|
| Gauge of Layer (A) (μm) | 1.2 | Molding Impossible | 2.2 | 1.5 | 0.5 | 2.2 | 2.2 | 2.1 | 1.8 | 12 | 2.1 | 45 | |
| Evaluation Result of Laminate (C) | | | | | | | | | | | | | |
| Indoor Running Test | Crack in Layer | — | No Crack | No Crack | No Crack | No Crack | No Crack | No Crack | No Crack | Crack in Layer | No Crack | Crack in Layer | Min. 45 μm |
| Air Permeation Coefficient (×10$^{-12}$ cc·cm/cm$^2$·s·cmHg) | <1 | — | <1 | <1 | <1 | <1 | <1 | <1 | 18.2 | <1 | 84.7 | 19.8 | <1 |
| Air Leakage | G | — | G | G | G | G | G | G | G | G | P | G | G |

| | Ex. 7 | Ex. 8 | Ex. 9 | Ex. 10 |
|---|---|---|---|---|
| Formulation (wt. part) | | | | |
| BESNOTL (PA11) | 40 | 40 | — | — |
| 3030XA (PA12) | — | — | 45 | — |
| MA510 (Mah-EB) | 60 | — | — | — |
| VA1840 (Mah-EO) | — | 60 | — | — |
| VA1803 (Mah-EO) | — | — | 55 | — |
| Compound 2 (see Table IV) | — | — | — | 100 |
| Evaluation Result of Polymer (B) | | | | |
| Young's Modulus (MPa) | 135 | 128 | 215 | 45 |
| Melt Viscosity (Pa·s) | 930 | 870 | 1120 | 1215 |
| Polymer of Layer (A) | EVOH | EVOH | PA6 | EVOH |
| Gauge of Layer (A) (μm) | 1.5 | 2.2 | 1.1 | 2.1 |
| Evaluation Result of Laminate (C) | | | | |
| Indoor Tire Test | No Crack | No Crack | No Crack | No Crack |
| Durability Test | G | G | G | G |
| Air Permeation Coefficient (×10$^{-12}$ cc·cm/cm$^2$·sec·cmHg) | <1 | <1 | 15.9 | <1 |
| Air Leakage Test | G | G | G | G |

*1 Since the viscosity of the compound is high, the melt draw of the rubber compound was not possible, although the co-extrusion through a T-die, and it was not possible to make the thickness of the layer (A) to less than 10 μm.

TABLE VII

Evaluation of (B)/(A)/adhesive(F) three layer film

| | Ex. 11 | Ex. 12 | Ex. 13 |
|---|---|---|---|
| Formulation (wt. part) | | | |
| BESNOTL (PA11) | 30 | 30 | 35 |
| 5033B (PA6.66) | 10 | 10 | 10 |
| VA1840 (Mah-EO) | 60 | — | — |
| VA1803 (Mah-EO) | — | 60 | 55 |
| Evaluation Result of Polymer (B) | | | |
| Young's Modulus (MPa) | 140 | 132 | 230 |
| Melt Viscosity (Pa·s) | 960 | 910 | 1220 |
| Polymer of layer (A) | EVOH | EVOH | EVOH |
| Gauge of Layer (A) (μm) | 1.6 | 2.5 | 2.1 |
| Evaluation Result of Laminate (C) | | | |
| Indoor Running Test | No crack | No crack | No crack |
| Air Permeation Coefficient (×10$^{-12}$ cc·cm/cm$^2$·sec·cmHg) | <1 | <1 | <1 |
| Air Leakage | G | G | G |

The invention claimed is:

1. A laminate (C) of a thermoplastic polymer composition comprising: at least one thermoplastic resin composition (A) having an air permeation coefficient of 10×10$^{-12}$ cc·cm/cm$^2$·sec·cmHg or less, laminated with at least one thermoplastic polymer composition (B) having a melt viscosity of 500-2000 Pa·s and a Young's modulus at a room temperature of 1-400 MPa, wherein the thickness of a layer of the thermoplastic resin composition (A) is 0.05-10 μm, the thickness of a layer of the thermoplastic polymer composition (B) is 0.1-100 μm and the air permeation coefficient of the laminate (C) of 20×10$^{-12}$ cc·cm/cm$^2$·sec·cmHg or less,
wherein the thermoplastic polymer composition (B) is composed of a modified polymer composition (E) dispersed in a matrix of a thermoplastic resin composition (D).

2. A laminate (C) as claimed in claim 1, further comprising at least one layer of an adhesive (F) layer.

3. A laminate (C) as claimed in claim 1, wherein a layer of the thermoplastic resin composition (A) is sandwiched with layers of the same or different thermoplastic polymer compositions (B).

4. A laminate (C) as claimed in claim 1 wherein the air permeation coefficient of the thermoplastic resin composition (A) is 2.5×10$^{-12}$ cc·cm/cm$^2$·sec·cmHg or less.

5. A laminate (C) as claimed in claim 1, wherein the thermoplastic resin composition (A) comprises one or more ethylene-vinyl alcohol copolymers and/or polyamide resins.

6. A laminate (C) as claimed in claim 1, wherein the thermoplastic resin composition (D) is at least one member selected from the group consisting of Nylon 11, Nylon 12, Nylon 666, Nylon 610, Nylon 612, Nylon 6, Nylon 66.

7. A laminate (C) as claimed in claim 1, wherein the modified polymer composition (E) is at least one member selected from the group consisting of brominated isobutyrene-p-methylstyrene copolymers and maleic anhydride-modified ethylene-α-olefin copolymers.

8. A laminate (C) as claimed in claim 7, wherein the weight ratio of the compositions (D) and (E) ((D)/(E)) is 60/40 to 30/70.

9. A laminate (C) as claimed in claim 1, wherein the thermoplastic polymer composition (B) is an at least partially dynamically vulcanized alloy.

10. A laminate (C) as claimed in claim 1, wherein the laminate comprises at least three layers, where the first layer has a thickness of 10 to 100 μm and comprises an at least partially dynamically vulcanized thermoplastic polymer composition (B) comprising a matrix of thermoplastic resin (D) and a dispersed phase of modified polymer (E), the second layer has a thickness of 0.1 to 10 μm thick and comprises an ethylene-vinyl alcohol copolymer having from 15 to 60 mole % ethylene, a melting point of from 145 to 250° C., and a permeability of $0.05 \times 10^{-12}$ cc·cm/cm²·s·cmHg or less, and the third layer has a thickness of 10 to 100 μm and comprises the same or at least partially different dynamically vulcanized thermoplastic polymer composition (B) comprising a matrix of thermoplastic resin (D) and a dispersed phase of modified polymer (E).

11. A laminate (C) as claimed in claim 10, wherein the at least partially dynamically vulcanized thermoplastic polymer compositions (B) present in the first and third layers, independently, comprise a matrix of polyamide.

12. A laminate (C) as claimed in claim 10, wherein the at least partially dynamically vulcanized thermoplastic polymer compositions (B) present in the first and third layers, independently, comprise a matrix of polyamide (D) and a dispersed phase of functionalized polymer.

13. A laminate (C) as claimed in claim 12, wherein the functionalized polymer comprises maleated rubber.

14. A laminate (C) as claimed in claim 12, wherein the functionalized polymer comprises halogenated isobutylene based rubber.

15. A laminate (C) as claimed in claim 10, wherein the first and third layers are different thicknesses.

16. A laminate (C) as claimed in claim 10, wherein the first and third layers are the same thickness.

17. A laminate (C) as claimed in claim 10, wherein the at least partially dynamically vulcanized thermoplastic polymer compositions (B) present in the first and/or third layers further comprises nanoclay.

18. A method for producing the laminate (C) of the thermoplastic polymer composition according to claim 1 comprising multi-layer extrusion molding the thermoplastic resin composition (A) and the thermoplastic polymer composition (B) in a cylindrical form.

19. A pneumatic tire using, as an inner liner, the laminate (C) of the thermoplastic polymer according to claim 1.

* * * * *